US008403117B2

(12) United States Patent
Ishiwada et al.

(10) Patent No.: US 8,403,117 B2
(45) Date of Patent: Mar. 26, 2013

(54) HYDRAULIC CONTROL DEVICE OF LOCKUP CLUTCH

(75) Inventors: Takeshi Ishiwada, Anjo (JP); Kazuaki Nakamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 398 days.

(21) Appl. No.: 12/742,827

(22) PCT Filed: Sep. 29, 2008

(86) PCT No.: PCT/JP2008/067689
§ 371 (c)(1),
(2), (4) Date: May 13, 2010

(87) PCT Pub. No.: WO2009/063701
PCT Pub. Date: May 22, 2009

(65) Prior Publication Data
US 2010/0282558 A1 Nov. 11, 2010

(30) Foreign Application Priority Data

Nov. 16, 2007 (JP) ................................. 2007-297548

(51) Int. Cl.
*F16H 61/14* (2006.01)
(52) U.S. Cl. ..................................................... 192/3.29
(58) Field of Classification Search .............. 192/3.29, 192/3.3
See application file for complete search history.

(56) References Cited

U.S. PATENT DOCUMENTS 5,605,210 A 2/1997 Koike et al.
6,662,918 B2 * 12/2003 Takeuchi et al. ............. 192/3.29
2004/0226795 A1 11/2004 Morise et al.
2007/0186981 A1 * 8/2007 Fukushima et al. .......... 137/339

FOREIGN PATENT DOCUMENTS

| JP | Y2-61-21639 | 6/1986 |
|---|---|---|
| JP | A-63-190972 | 8/1988 |
| JP | A-1-299361 | 12/1989 |
| JP | A-7-174223 | 7/1995 |
| JP | A-7-180768 | 7/1995 |
| JP | A-2004-340308 | 12/2004 |
| JP | A-2006-242347 | 9/2006 |
| JP | A-2007-40374 | 2/2007 |

OTHER PUBLICATIONS

International Search Report issued in International Patent Application No. PCT/JP2008/067689 on Dec. 22, 2008.
Japanese Office Action issued in Japanese Application No. 2007-297548 on Oct. 11, 2011 (with partial translation).

* cited by examiner

*Primary Examiner* — Richard M. Lorence
*Assistant Examiner* — Lillian Nguyen
(74) *Attorney, Agent, or Firm* — Oliff & Berridge, PLC

(57) ABSTRACT

When a vehicle stops in a driving range such as a D-range at low oil temperature such as the initial stage of starting the engine, air-mixed operating oil may be supplied from the second oil passage into the torque converter. In this case, at the release of the lockup clutch in which the second line oil pressure is supplied from the second oil passage to the lockup clutch, the third oil passage is shut off (blocked) to inhibit the discharge of the operating oil. Therefore, regardless of larger pipe passage resistance due to higher viscosity, the operating oil in the torque converter is certainly discharged from the first oil passage through the cooler oil passage to the oil cooler and bubbles in the torque converter is reduced in association of the discharge of the operating oil.

8 Claims, 9 Drawing Sheets

|  | C1 | C2 | B1 | B2 | B3 |
|---|---|---|---|---|---|
| 1st | ○ |  |  | ○ |  |
| 2nd | ○ |  | ○ |  |  |
| 3rd | ○ |  |  |  | ○ |
| 4th | ○ | ○ |  |  |  |
| 5th |  | ○ |  |  | ○ |
| 6th |  | ○ | ○ |  |  |
| R |  |  |  | ○ | ○ |
| N |  |  |  |  |  |

HYDRAULIC CONTROL DEVICE OF LOCKUP CLUTCH

TECHNICAL FIELD

The present invention relates to a hydraulic control device of a lockup clutch and particularly to a technique of improving impairment of driving performance of a vehicle caused by deterioration of transmission torque of a fluid-type power transmitting device due to mixing-in of air at low oil temperature.

BACKGROUND ART

A kind of hydraulic control device of a lockup clutch has a lockup clutch, a first oil passage, a second oil passage, and a third oil passage. The lockup clutch is included in a fluid-type power transmitting device such as a torque converter and a fluid coupling and is engaged and released based on oil pressure. The first oil passage is communicated with an engagement-side oil chamber of the lockup clutch to supply an engagement oil pressure to the engagement-side oil chamber at the engagement of the lockup clutch. The second oil passage is communicated with a release-side oil chamber of the lockup clutch to supply a release oil pressure to the release-side oil chamber at the release of the lockup clutch. The third oil passage is communicated with the engagement-side oil chamber of the lockup clutch to discharge operating oil in the engagement-side oil chamber at the engagement of the lockup clutch. A device described in Patent Document 1 is an example of such a hydraulic control device and operating oil is discharged from the third oil passage and returned through an oil cooler to an oil pan at both the engagement and the release of the lockup clutch.

Patent Document 1: Japanese Patent Application Laid-Open Publication No. 63-190972

DISCLOSURE OF THE INVENTION

Problems to be Solved by the Invention

Although not yet known as a hydraulic control device of a lockup clutch, a lockup relay valve is conceived that is connected to the first oil passage, the second oil passage, and the third oil passage to operate as follows. At the engagement of the lockup clutch, the lockup relay valve is turned to an ON-side communication state for connecting a line oil passage supplied with a predetermined line oil pressure to the first oil passage and for connecting the second oil passage and the third oil passage to a discharging oil passage. On the other hand, at the release of the lockup clutch, the lockup relay valve is turned to an OFF-side communication state for connecting the line oil passage to the second oil passage and for connecting the first oil passage and the third oil passage to an oil cooler.

A hydraulic control device 200 of FIG. 10 is a diagram of an example of such a hydraulic control device of a lockup clutch and a lockup relay valve 202 is connected with a first oil passage 130, a second oil passage 132, and a third oil passage 134. The lockup relay valve 202 is alternatively switched by a signal oil pressure from a solenoid valve SL, between the ON-side communication state indicated by solid lines and the OFF-side communication state indicated by dash lines. When the lockup relay valve 202 is turned to the ON-side communication state, a line oil passage 118 is connected to the first oil passage 130. This causes a second line oil pressure PL2 to be supplied as an engagement oil pressure from the first oil passage 130 to an engagement-side oil chamber 120 of a lockup clutch 28, and the second oil passage 132 and the third oil passage 134 are connected to discharging oil passages 136 and 138, respectively.

The discharging oil passages 136, 138 are connected to a lockup control valve 104 and the oil pressure of the discharging oil passage 136 is always controlled by a signal oil pressure output from a linear solenoid valve SW. This adjusts an oil pressure Poff in a release-side oil chamber 122 of the lockup clutch 28 to put the lockup clutch 28 into the complete engagement state or a predetermined slip state. The discharging oil passage 138 communicated with the third oil passage 134 is opened/closed by the lockup control valve 104 depending on the slip state of the lockup clutch 28. Operating oil in a torque converter 32 is drained at a flow rate corresponding to the slip state of the lockup clutch 28 and new operating oil is introduced from the first oil passage 130 into the torque converter 32 to constrain the increase in temperature due to the slip.

On the other hand, when the lockup relay valve 202 is turned to the OFF-side communication state, as depicted in FIG. 11, the line oil passage 118 is connected to the second oil passage 132 and the second line oil pressure PL2 is supplied as a release oil pressure from the second oil passage 132 to the release-side oil chamber 122 of the lockup clutch 28. At the same time, the first oil passage 130 and the third oil passage 134 are connected to an oil cooler 142 through cooler oil passages 140 and 204 linked in the middle. Although the operating oil in the torque converter 32 is agitated by relative rotation of a turbine impeller $32t$ and a pump impeller $32p$ and the oil temperature is increased when the lockup clutch 28 is released, the operating oil is returned through the oil cooler 142 to an oil pan 112 and the temperate increase in the operating oil is constrained.

In such a hydraulic control device 200, if a vehicle stops for a long time in, for example, a driving range such as a D-range at low oil temperature of the operating oil such as the initial stage of starting an engine, bubbles easily stay and accumulate in the torque converter 32. The reason is that since the oil surface (oil level) of the oil pan 112 lowers at low oil temperature, bubble-mixed operating oil due to suction of air is supplied from the second oil passage 132 to the torque converter 32. The reason is also that although the operating oil is discharged from the first oil passage 130 and the third oil passage 134 through the cooler oil passages 140 and 204 to the oil cooler 142, the rotation of the turbine impeller $32t$ stops when a vehicle stops. Since the operating oil is pressed toward the outer circumference by a centrifugal force at the time of rotation, the bubbles are collected on the center side and, due to the supply of the operating oil from the second oil passage 132, the air-mixed operating oil is pressed and discharged toward the first oil passage 130 and the third oil passage 134 provided in a rotation shaft at the center portion. On the other hand, when the rotation stops, the bubbles easily adhere to and stay on the turbine impeller $32t$ and gradually gather and grow in size.

The viscosity of the operating oil becomes high at low oil temperature and the pipe passage resistance of the oil cooler 142 becomes large. Therefore, as indicated by white arrows of FIG. 11, the operating oil circulates from one of the first oil passage 130/the cooler oil passage 140 and the third oil passage 134/the cooler oil passage 204 to the other instead of going to the oil cooler 142 and the bubble-mixed operating oil easily keeps staying in the torque converter 32. If a large amount of such bubbles stays in the torque converter 32 due to a long stop, it is problematic that the starting drive performance is impaired since sufficient transmission torque of the torque converter 32 is unable to be acquired because of the presence of bubbles at the start of a vehicle.

The present invention was conceived in view of the background and it is therefore the object of the present invention to improve impairment of driving performance of a vehicle caused by insufficient transmission torque at start since bubbles stay and accumulate in a fluid-type power transmitting device while the vehicle stops at low oil temperature.

Means for Solving the Problems

The object indicated above is achieved in the first aspect of the present invention, which provides a hydraulic control device controlling a lockup clutch included in a fluid-type power transmitting device, comprising: (a) a first oil passage communicated with an engagement-side oil chamber for engaging the lockup clutch to be engaged/released based on an oil pressure to supply an engagement oil pressure to the engagement-side oil chamber at engagement of the lockup clutch; (b) a second oil passage communicated with an release-side oil chamber for releasing the lockup clutch to supply a release oil pressure to the release-side oil chamber at release of the lockup clutch; (c) a third oil passage communicated with the engagement-side oil chamber of the lockup clutch to discharge operating oil in the engagement-side oil chamber at the engagement of the lockup clutch; and (d) a discharge inhibiting means that inhibits discharge of the operating oil from the third oil passage at the release of the lockup clutch with the release oil pressure supplied from the second oil passage to the lockup clutch.

The object indicated above is achieved in the second aspect of the present invention, which provides the hydraulic control device of the lockup clutch of the first aspect of the present invention, wherein the discharge inhibiting means includes an oil passage switching valve to shut off the third oil passage at the release of the lockup clutch with the release oil pressure supplied to the lockup clutch.

Effects of the Invention

In the hydraulic control device of the lockup clutch, the release oil pressure is supplied from the second oil passage to the lockup clutch. At the release of the lockup clutch, the discharge of the operating oil from the third oil passage is inhibited. Therefore, when a vehicle stops at low oil temperature, if air-mixed operating oil is supplied from the second oil passage into the fluid-type power transmitting device, the operating oil is prevented from circulating through the first oil passage and the third oil passage. Therefore, regardless of larger pipe passage resistance due to higher viscosity, the operating oil in the fluid-type power transmitting device is certainly discharged from the first oil passage to such as the oil cooler and bubbles in the fluid-type power transmitting device is reduced in association of the discharge of the operating oil. This constrains the deterioration of transmission torque at the start due to the bubbles in the fluid-type power transmitting device and the drive performance is improved at the start of the vehicle at low temperature.

In the second aspect of the present invention, the discharge inhibiting means shuts off the third oil passage. Therefore, for example, a lockup relay valve switching the engagement (ON) and release (OFF) of the lockup clutch may be utilized. At the engagement of the lockup clutch, the lockup relay valve is turned to an ON-side communication state for connecting a line oil passage supplied with a predetermined line oil pressure to the first oil passage and for connecting the second oil passage and the third oil passage to a discharging oil passage. On the other hand, at the release of the lockup clutch, the lockup relay valve is turned to an OFF-side communication state for connecting the line oil passage to the second oil passage and for connecting the first oil passage to an oil cooler and shutting off the third oil passage. As above, this configuration may easily and inexpensively be achieved by slightly changing an oil passage of an existing switching valve.

BEST MODES FOR CARRYING OUT THE INVENTION

A fluid-type power transmitting device is disposed between a driving power source and a transmission, for example. Although an internal-combustion engine generating a power by combustion of fuel such as a diesel engine and a gasoline engine is preferably used as the driving power source, various driving power sources may be employed such as an electric motor and those using both an electric motor and an internal-combustion engine. Although the transmission is not necessarily needed, either a stepped transmission such as a planetary gear type or a continuously variable transmission such as a belt type may be employed if provided. Although a torque converter may preferably be used as the fluid-type power transmitting device, a fluid coupling, etc., may also be employed.

The discharge inhibiting means includes an oil passage switching valve, for example. For example, the oil passage switching valve allows the operating oil to be discharged from the third oil passage at the engagement of the lockup clutch when the engagement oil pressure is supplied from the first oil passage to the lockup clutch. On the other hand, the oil passage switching valve shuts off the third oil passage to inhibit the discharge of the operating oil at the release of the lockup clutch when the release oil pressure is supplied from the second oil passage to the lockup clutch. Although the oil passage switching valve may always shut off the third oil passage while the lockup clutch is released, the oil passage switching valve may perform the shut-off only when the oil temperature is lower than a predetermined value and may allow the discharge and linked to, for example, the first oil passage to be connected to an oil cooler, etc., when the oil temperature becomes equal to or higher than the predetermined value.

In the hydraulic control device 200 of FIG. 10 described later, a switching valve opening/closing a cooler oil passage 204 depending on the oil temperature may be provided on a linking portion between cooler oil passages 140 and 204. Although the switching valve shutting off the third oil passage is preferably used as the discharge inhibiting means, the discharge may be inhibited by applying to the third oil passage a predetermined oil pressure, for example, an oil pressure at the same level as the release oil pressure supplied from the second oil passage.

Separately from a lockup relay valve switching the engagement and release of the lockup clutch, the oil passage switching valve may be disposed between the lockup relay valve and the fluid-type power transmitting device. However, the lockup relay valve may be provided with a function of the discharge inhibiting means. For example, at the engagement of the lockup clutch, the lockup relay valve is turned to an ON-side communication state for connecting a line oil passage supplied with a predetermined line oil pressure to the first oil passage and for connecting the second oil passage and the third oil passage to a discharging oil passage. On the other hand, at the release of the lockup clutch, the lockup relay valve may be configured to be turned to an OFF-side communication state for connect the line oil passage to the second oil passage and for connecting the first oil passage to the oil cooler and shutting off the third oil passage. Such a lockup relay valve is configured such that a spool is alternatively moved to two positions to switch the ON-side communication state and the OFF-side communication state depending on whether a predetermined signal oil pressure is supplied from a solenoid valve, for example. However, the spool may directly be moved by a solenoid.

The discharging oil passage connected to the second oil passage at the time of the ON-side communication state is connected to a lockup control valve that turns the lockup clutch to the complete engagement state or a predetermined slip state. For this purpose, for example, the oil pressure in the release-side oil chamber may be adjusted by controlling the oil pressure of the discharging oil passage. Although the temperatures of the lockup clutch itself and the operating oil are increased because of friction due to slip at the engagement of such a lockup clutch, the temperature increase is constrained by freshly supplying the operating oil from the first oil passage as the operating oil is discharged from the third oil passage.

In the lockup control valve, a position of the spool is continuously changed by continuously changing the oil pressure of the signal oil pressure supplied from a linear solenoid valve, for example. In this way, the oil pressure of the discharging oil passage, i.e., the oil pressure in the release-side oil chamber is configure to be adjustable by continuously changing the communication state of the discharging oil passage with a drain oil passage and a line oil passage. The discharging oil passage connected to the third oil passage through the lockup relay valve may be drained through the oil cooler or directly to an oil pan without passing through the lockup control valve. However, the connection with the lockup control valve may be achieved such that the operating oil is drained at flow rates changing depending on the slip state of the lockup clutch, i.e., a position of the spool. The flow rate of the operating oil discharged from the third oil passage is determined such that the lockup clutch is engaged at predetermined engagement torque by the engagement oil pressure supplied from the first oil passage to the engagement-side oil chamber.

EXPLANATIONS OF LETTERS OR NUMERALS

Figures 1, 2:
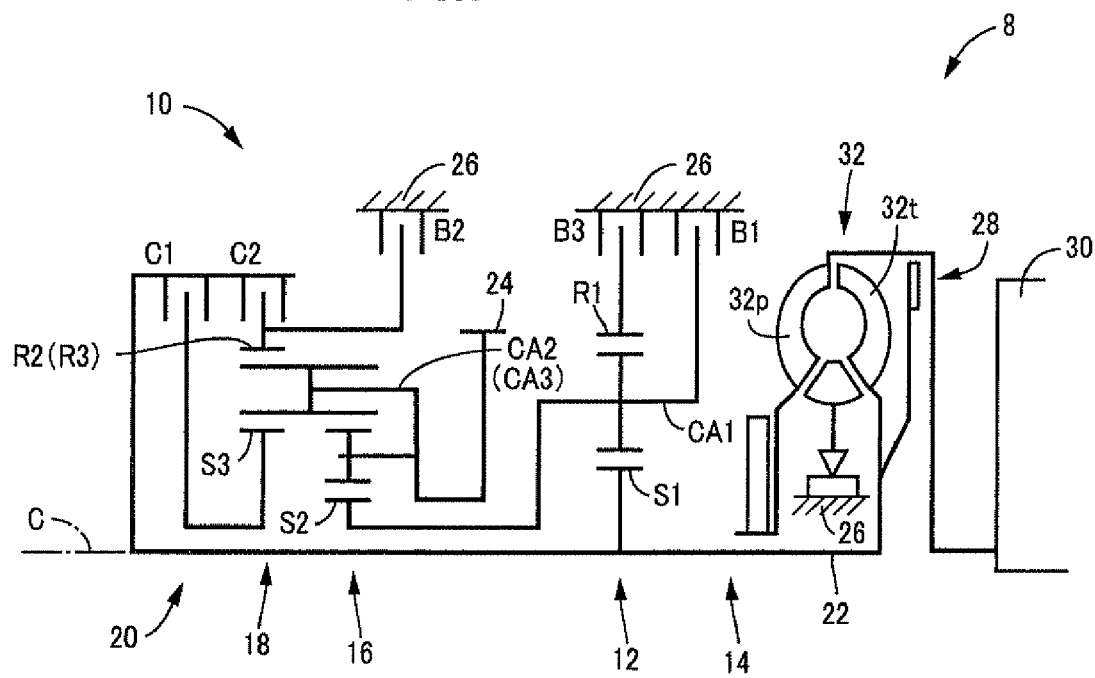
FIG. 1 is a schematic diagram for explaining a configuration of a vehicle power transmitting device to which the present invention is preferably applied.
FIG. 2 is a chart for explaining operational states of a frictional engagement device when a plurality of gear stages of the automatic transmission of FIG. 1 are formed.

28: lockup clutch
32: torque converter (fluid-type power transmitting device)
100: hydraulic control device
102: lockup relay valve (discharge inhibiting means)
120: engagement-side oil chamber
122: release-side oil chamber
130: first oil passage
132: second oil passage
134: third oil passage
PL2: second line oil pressure (engagement oil pressure, release oil pressure)

Embodiment

An embodiment of the present invention will now be described in detail with reference to the drawings.

FIG. 1 is a schematic diagram for explaining a configuration of a vehicle power transmitting device 8 to which the present invention is preferably applied. The vehicle power transmitting device 8 is preferable used for an FF vehicle, which is equipped with the vehicle power transmitting device in the right-and-left direction (lateral placement) of the vehicle and power of an engine 30 is transmitted from a torque converter 32 and an automatic transmission 10 through a differential gear device 34 and a pair of axles 38 to a pair of drive wheels 40. The engine 30 is a drive power source and is made up of an internal-combustion engine such as a gasoline engine and a diesel engine. The torque converter 32 is a fluid-type power transmitting device and includes a lockup clutch 28 that links, in an integrated manner or in a relatively rotating manner, a pump impeller 32p linked to a crankshaft of an input/output member, i.e., the engine 30 and a turbine impeller 32t linked to an input shaft 22 of the automatic transmission 10.

The automatic transmission 10 has a first shifting portion 14 and a second shifting portion 20 on the same axis (on a common axial center C). The first shifting portion 14 is mainly made up of a first planetary gear device 12 of a single pinion type in a transmission case 26 that is a non-rotating member attached to a vehicle body. The second shifting portion 20 is mainly made up of a second planetary gear device 16 of a double pinion type and a third planetary gear device 18 of a single pinion type as a Ravigneaux type. The automatic transmission 10 shifts the rotation of the input shaft 22 and outputs the shifted rotation from an output gear 24. The output gear 24 corresponds to an output member of the automatic transmission 10 and acts as a differential driving gear engaging with a differential driven gear (large-diameter gear) 36 for transmitting power to the differential gear device 34 depicted in FIG. 3. Although the automatic transmission 10 and the torque converter 32 are substantially symmetrically configured relative to the center line (axial center) C, the lower half of the center line C is not depicted in the schematic diagram of FIG. 1.

The automatic transmission 10 includes clutches C1, C2 and brakes B1 to B3 (hereinafter, simply a clutch C and a brake B if not particularly differentiated). The clutch C and the brake B switch a linkage relationship of rotating elements (sun gear S1 to S3, carriers CA1 to CA3, and ring gears R1 to R3) and a fixed element of the first shifting portion 14 and the second shifting portion 20. This leads to the formation of six forward gear stages of a first speed gear stage "1st" to a sixth speed gear stage "6th" and one backward gear stage "R" as depicted in FIG. 2. FIG. 2 is an engagement operation table for explaining a plurality of gear stages and the operational states of the clutches C1, C2, and the brakes B1 to B3 when the gear stages are formed, and "o" represents engagement.

The first speed gear stage is formed by the engagement of the clutch C1 and the brake B2; the second speed gear stage is formed by the engagement of the clutch C1 and the brake B1; and the third speed gear stage is formed by the engagement of the clutch C1 and the brake B3. The fourth speed gear stage is formed by the engagement of the clutch C1 and the clutch C2; the fifth speed gear stage is formed by the engagement of the clutch C2 and the brake B3; and the sixth speed gear stage is formed by the engagement of the clutch C2 and the brake B1. The backward gear stage is formed by the engagement of the brake B2 and the brake B3 and the neutral state shutting off the power transmission is formed by releasing all the clutches C1, C2 and the brakes B1 to B3.

The clutch C and the brake B are a hydraulic frictional engagement devices subjected to the engagement control of hydraulic actuators such as multi-disc clutches and brakes. Excitation, deexcitation, and current control of linear solenoid valves SLC1, SLC2, SLB1, SLB2, and SLB3 acting as electromagnetic valve devices of a hydraulic control device 100 (see FIG. 3) switch the engagement and release state and control a transitional oil pressure at the engagement and release.

Figure 3:
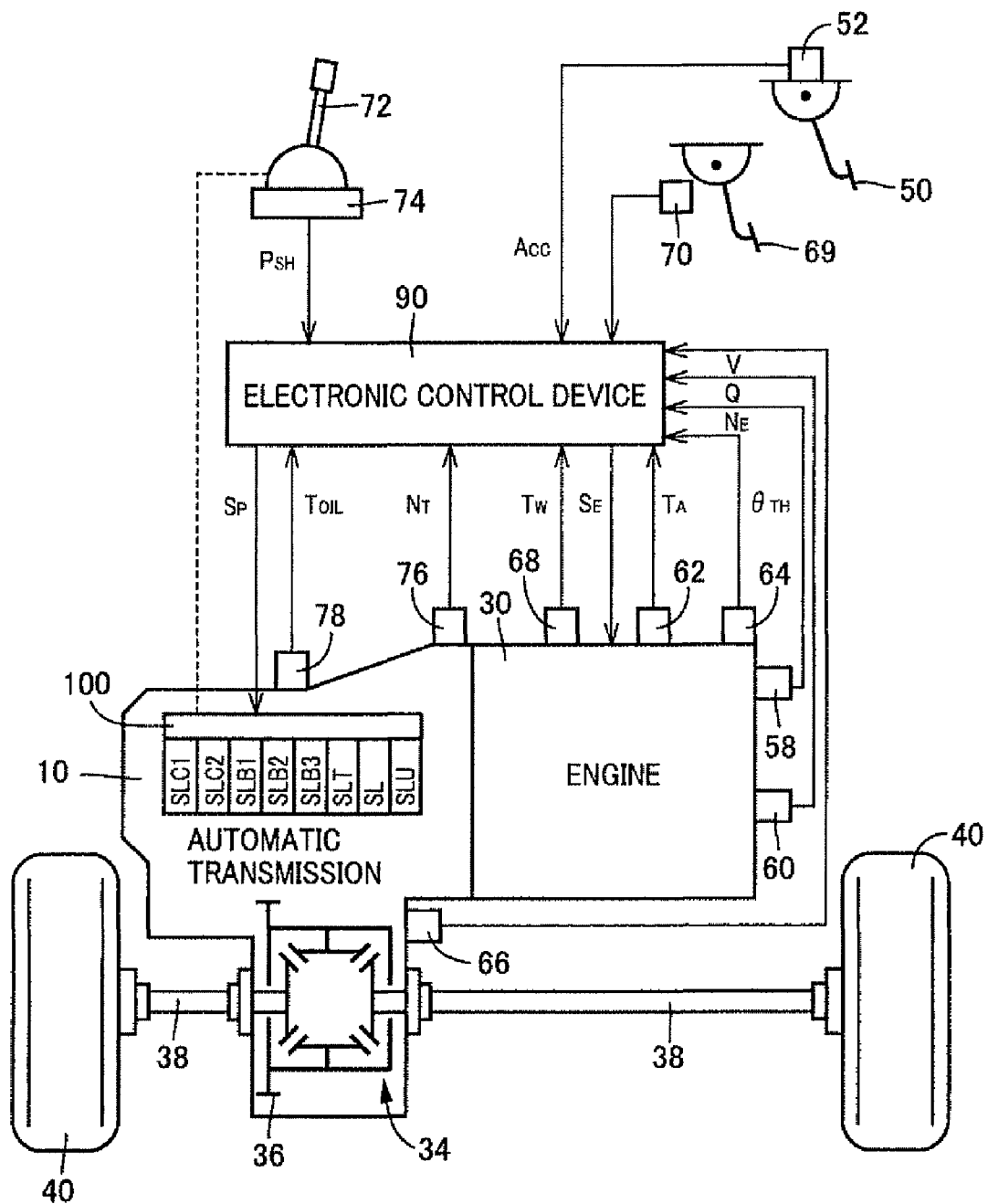
FIG. 3 is a block line diagram for explaining a relevant part of an electric control system provided on a vehicle for controlling the automatic transmission of FIG. 1, etc.

FIG. 3 is a block line diagram for explaining a relevant part of an electric control system provided on a vehicle for controlling the automatic transmission 10 of FIG. 1, etc. An electronic control device 90 includes a so-called microcomputer disposed with CPU, RAM, ROM, an input/output interface, for example. The CPU utilizes a temporary storage function of the RAM and executes a signal process in accordance with a program stored in the ROM to perform the output control of the engine 30, the shift control of the automatic transmission 10, the engagement and release control of the lockup clutch 28, etc. The CPU may be separately configured for the engine control and the shift control as needed.

In FIG. 3, the control system is provided with an accelerator operation amount sensor 52 for detecting an operation amount (accelerator opening) Acc of an accelerator pedal 50, an engine rotating speed sensor 58 for detecting an engine rotating velocity $N_E$ of the engine 30, an intake air amount sensor 60 for detecting an intake air amount Q of the engine 30, an intake air temperature sensor 62 for detecting a temperature $T_A$ of intake air, a throttle valve opening sensor 64 for detecting an opening $\theta_{TH}$ of an electronic throttle valve, a vehicle velocity sensor 66 for detecting a vehicle velocity V (corresponding to a rotating velocity $N_{OUT}$ of the output gear 24), a cooling water temperature sensor 68 for detecting a cooling water temperature $T_W$ of the engine 30, etc. The control system is also provided with a brake switch 70 detecting presence of operation of a foot brake pedal 69 that is a service brake, a lever position sensor 74 for detecting a lever position (operation position) $P_{SH}$ of a shift lever 72 as a shift operating member, a turbine rotating velocity sensor 76 for detecting a turbine rotating velocity $N_T$, i.e., a rotating velocity $N_{IN}$ of the input shaft 22, an AT oil temperature sensor 78 for detecting an AT oil temperature $T_{OIL}$ that is an temperature of the operating oil in the hydraulic control device 100, etc.

These sensors and switches supply to the electronic control device 90 the signals indicative of the accelerator operation amount (accelerator opening) Acc, the engine rotating velocity $N_E$, the intake air amount Q, the temperature $T_A$ of intake air, the throttle valve opening $\theta_{TH}$, the vehicle velocity V, the output rotating velocity $N_{OUT}$, the engine cooling water temperature $T_W$, the presence of brake operation, the lever position $P_{SH}$ of the shift lever 72, the turbine rotating velocity $N_T$ (=input shaft rotating velocity $N_{IN}$), the AT oil temperature $T_{OIL}$, etc.

The shift lever 72 acts as a selecting operation means selecting the operational state of the automatic transmission 10 and is alternatively selected and operated to a "P" position for parking, an "N" position shutting off the power transmission, a "D" position for forward traveling, an "R" position for backward traveling, etc. The operation to the "D" position achieves the automatic shift mode (D-range) for traveling forward while automatically switching all the forward gear steps "1st" to "6th". The operation to the "R" position achieves the backward gear step "R" to enable backward traveling. A manual shift mode may also be selected in addition to the automatic shift mode to enable specification of other drive ranges such as a 4th range and a 3rd range limiting the shift range of the automatic shift. The automatic shift mode, etc., may be selected by a push-button switch, etc., instead of the shift lever 72.

On the other hand, the electronic control device 90 outputs an engine output control command signal $S_E$ for the output control of the engine 30, a signal that drives a throttle actuator for controlling opening/closing of the electronic throttle valve, for example, in accordance with the accelerator operation amount Acc, an injection signal for controlling an amount of fuel injected from a fuel injecting device, an ignition timing signal for controlling the timing of ignition of the engine 30 by an igniting device. The electronic control device 90 also outputs a shift control command signal $S_P$ for the shift control of the automatic transmission 10, a signal that controls the linear solenoid valves SLC1, SLC2, SLB1, SLB2, and SLB3 in the hydraulic control device 100, for example, for switching the gear steps of the automatic transmission 10, etc.

Figure 4:
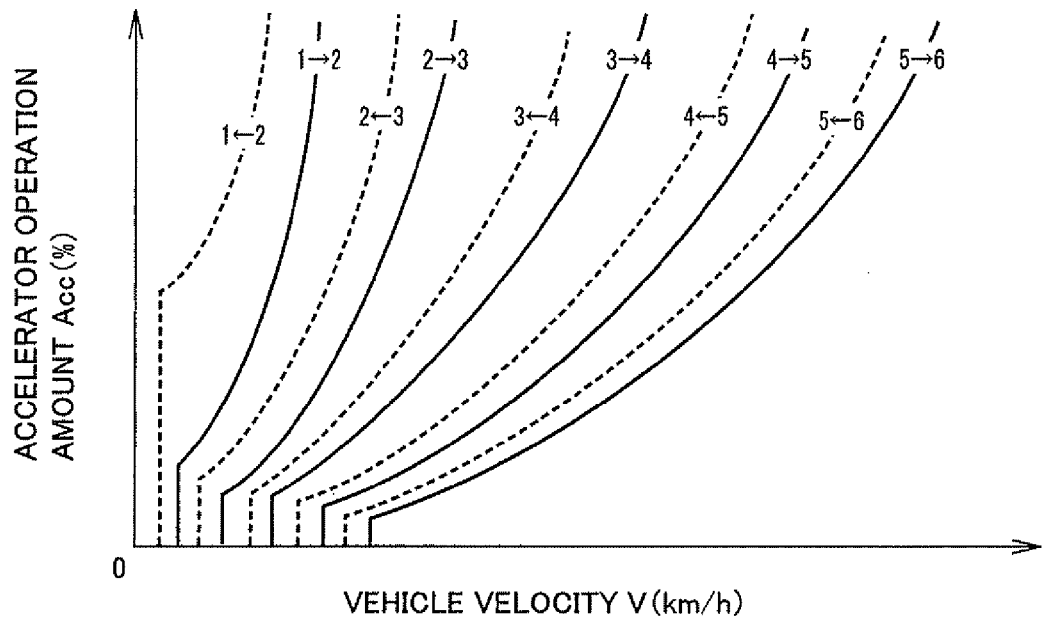
FIG. 4 is a diagram of an example of a shift map used for the shift control of the automatic transmission performed by the electric control device of FIG. 3.

The shift control will specifically be described. The electronic control device 90 functionally includes a shift control means that determines whether the shifting of the automatic transmission 10 should be executed and that executes the shift control in accordance with the determination. For example in the automatic shift mode, the shifting is executed based on the actual vehicle velocity V and accelerator operation amount Acc from a relationship (a map, a shift chart) stored in advance using the vehicle velocity V and the accelerator operation amount Acc as parameters as depicted in FIG. 4. The electronic control device 90 outputs to the hydraulic control device 100 commands (a shift output, an oil pressure command) for causing the engagement and/or release of the hydraulic frictional engagement devices involved in the shifting of the automatic transmission 10 such that a desired gear step is formed, for example, in accordance with the engagement operation table depicted in FIG. 2. In other words, the commands are those causing the excitation or deexcitation of the linear solenoid valves for the shifting SLC1, SLC2, SLB1, SLB2, and SLB3 within the hydraulic control device 100 to perform the pressure control of the oil pressures supplied to the hydraulic actuators of the hydraulic frictional engagement devices.

Figure 5:
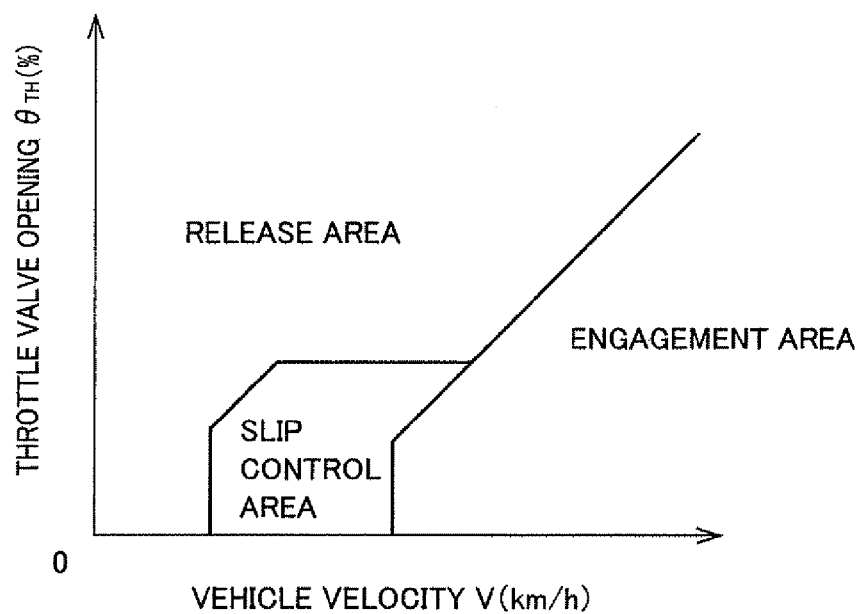
FIG. 5 is a diagram for explaining an example of a switching map used for the engagement/release control of a lockup clutch performed by the electric control device of FIG. 3.

The electronic control device 90 also has a function of a lockup control means that controls the engagement and release of the lockup clutch 28 in accordance with a switching map depicted in FIG. 5, for example. The hydraulic control device 100 includes a lockup relay valve 102 having the operational state switched by the solenoid valve SL, a lockup control valve 104 having the operational state controlled by the solenoid valve SLU, etc., as depicted in FIG. 6, in relation to the engagement and release control of the lockup clutch 28.

Figure 6:
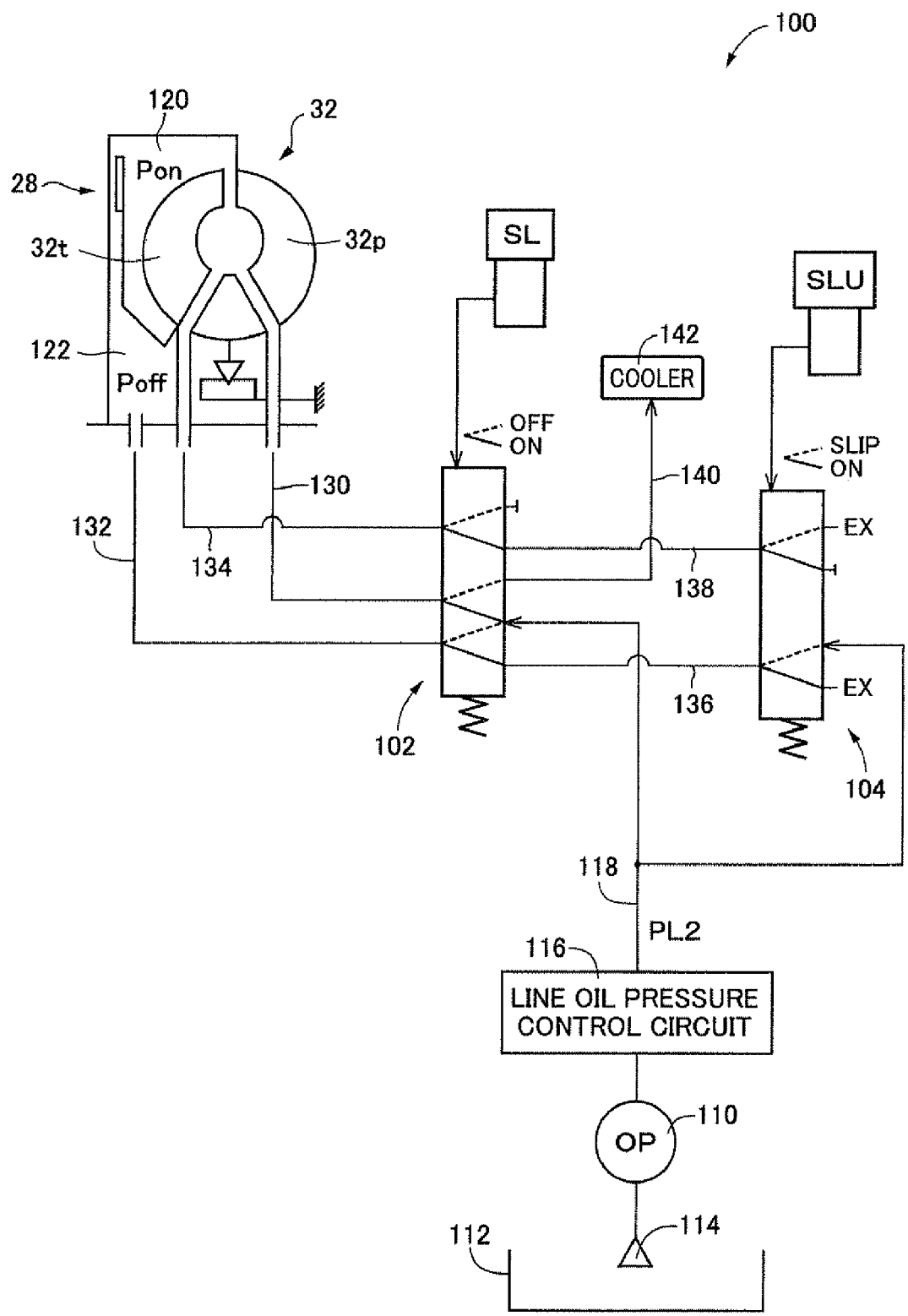
FIG. 6 is a circuit diagram for explaining a relevant configuration included in a hydraulic control device in association with the engagement/release control of the lockup clutch.

In FIG. 6, the operating oil is pumped up from an oil pan 112 through a strainer 114 by an oil pump 110 mechanically driven to be rotated by the engine 30. After a line oil pressure control circuit 116 adjusts the pressure to a second line oil pressure PL2, the operating oil is supplied through the line oil passage (a supplying oil passage) 118 to the lockup relay valve 102 and the lockup relay valve 104. The line oil pressure control circuit 116 configured by including a linear solenoid valve SLT, a primary regulator valve, etc., adjusts the second line oil pressure PL2 depending on the accelerator operation amount Acc in accordance with the control of the linear solenoid valve SLT by the electronic control device 90.

The torque converter 32 includes the engagement-side oil chamber 120 and the release-side oil chamber 122 on both sides of the lockup clutch 28. The lockup clutch 28 is engaged in accordance with predetermined engagement torque by a differential pressure $\Delta P$ between an oil pressure Pon in the engagement-side oil chamber 120 and an oil pressure Poff in the release-side oil chamber 122(=Pon−Poff). The engagement-side oil chamber 120 is connected to a first oil passage 130 and a third oil passage 134. The release-side oil chamber 122 is connected to a second oil passage 132 and the differential pressure $\Delta P$ is controlled by flow-in/flow-out of the operating oil from the oil passages 130, 132, and 134. The lockup clutch 28 is engaged (turned ON) and released (turned OFF) in this way.

Figure 7:
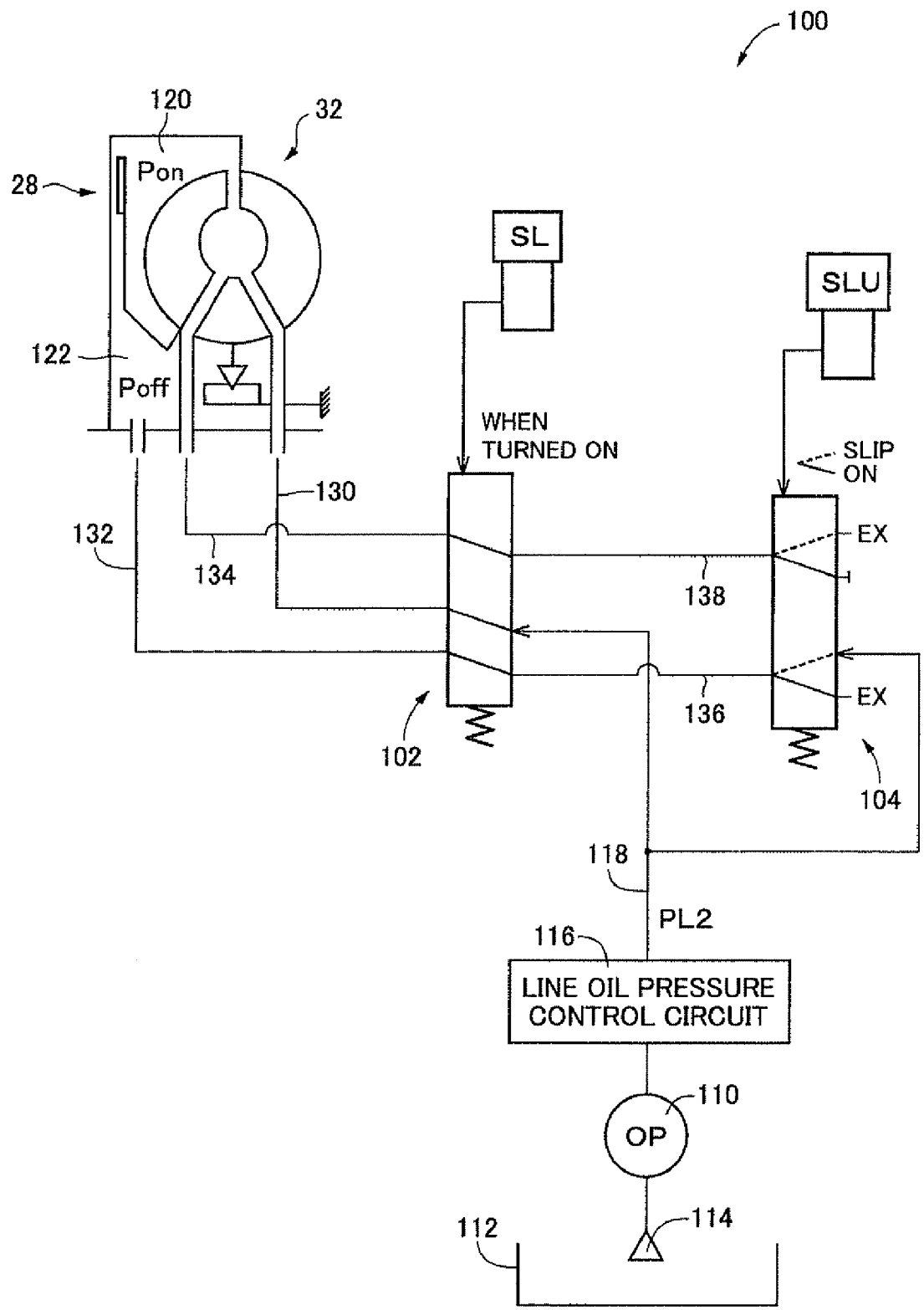
FIG. 7 is a diagram of a circuit configuration when a lockup relay valve is turned to an ON-side communication state in the hydraulic control device of FIG. 6.

The lockup relay valve 102 connected to the first oil passage 130, the second oil passage 132, and the third oil passage 134 is alternatively switched between the ON-side communication state (engagement state) indicated by solid lines and the OFF-side communication state (release state) indicated by dash lines in accordance with a signal oil pressure from the solenoid valve SL. When the lockup relay valve 102 is turned to the ON-side communication state, the line oil passage 118 is connected to the first oil passage 130 to supply the second line oil pressure PL2 as the engagement oil pressure from the first oil passage 130 to the engagement-side oil chamber 120 of the lockup clutch 28 and the second oil passage 132 and the third oil passage 134 are connected to discharging oil passages 136 and 138, respectively, as depicted in FIG. 7. The discharging oil passages 136 and 138 are connected to the lockup control valve 104 and the oil pressure of the discharging oil passage 136 is continuously controlled by the signal oil pressure output from the linear solenoid valve SLU to adjust the oil pressure Poff in the release-side oil chamber 122 and the lockup clutch 28 is turned to the complete engagement state or a predetermined slip state The lockup control valve 104 includes a drain oil passage EX that flows back the operating oil of the discharging oil passages 136 and 138 to the oil pan 112. The communication state of the drain oil passage EX and the line oil passage 118 is continuously changed to continuously adjust the oil pressure of the discharging oil passage 136 communicated with the release-side oil chamber 122 through the second oil passage 132, i.e., the oil pressure Poff in the release-side oil chamber 122. The discharging oil passage 138 communicated with the third oil passage 134 is opened/closed by the lockup control valve 104 depending on the slip state of the lockup clutch 28. This causes the operating oil in the torque converter 32 to be drained at a flow rate corresponding to the slip state of the lockup clutch 28 and new operating oil is introduced from the first oil passage 130 into the torque converter 32 to constrain the increase in temperature due to the slip.

In the lockup control valve 104, a position of a spool is continuously changed by continuously changing the oil pressure of the signal oil pressure supplied from the linear solenoid valve SLU and the communication sate of the discharging oil passages 136 with the drain oil passage EX and the line oil passage 118 is continuously changed. This leads to the adjustment of the oil pressure of the discharging oil passages 136, i.e., the oil pressure Poff in the release-side oil chamber 122. The communication state of the discharging oil passage 138 and the drain oil passage is continuously changed at the same time to continuously change the flow rate of the operating oil discharged from the discharging oil passage 138.

Figure 8:
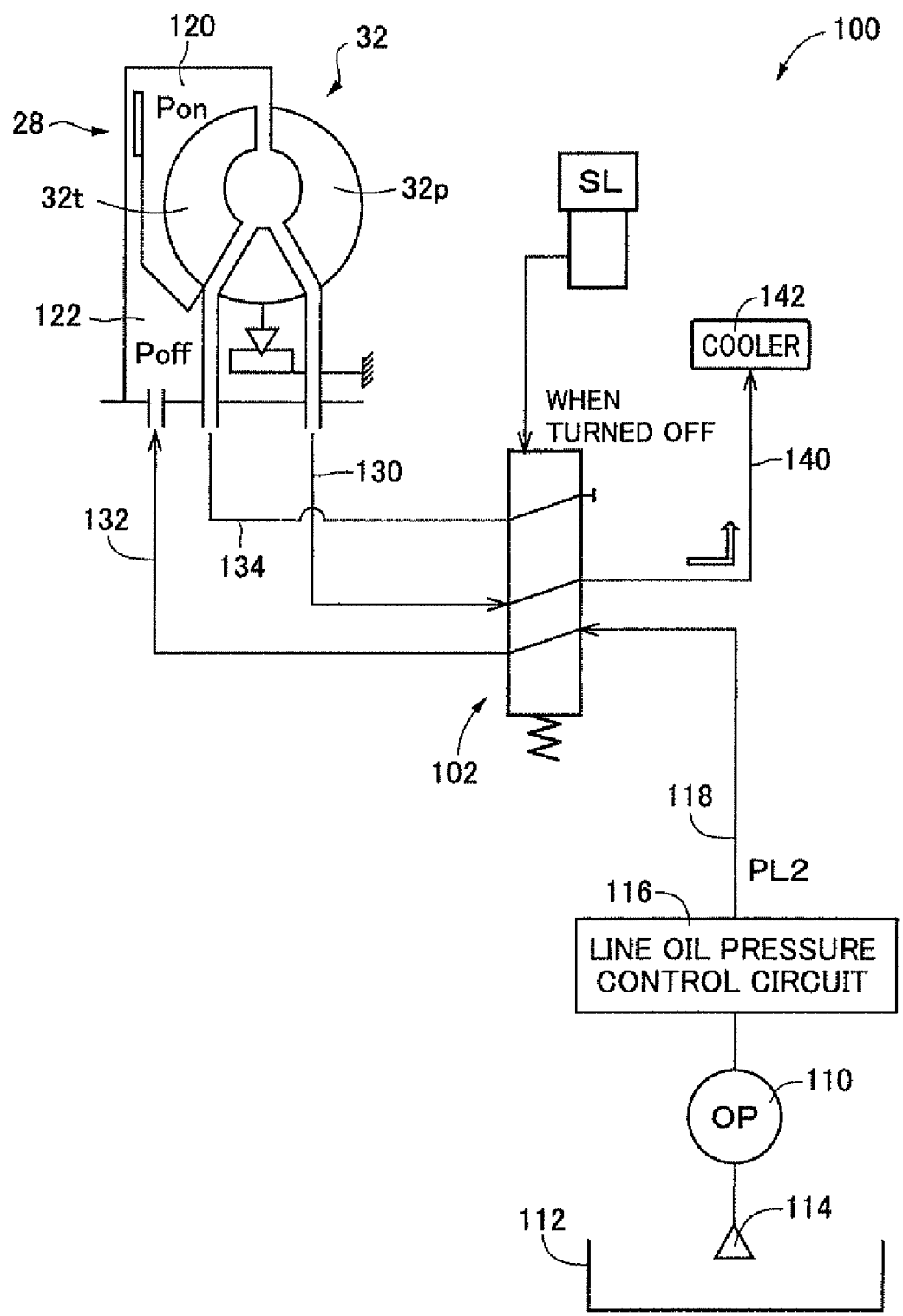
FIG. 8 is a diagram of a circuit configuration when the lockup relay valve is turned to an OFF-side communication state in the hydraulic control device of FIG. 6.

On the other hand, when the lockup relay valve 102 is turned to the OFF-side communication state, as depicted in FIG. 8, the line oil passage 118 is connected to the second oil passage 132 and the second line oil pressure PL2 is supplied as a release oil pressure from the second oil passage 132 to the release-side oil chamber 122 of the lockup clutch 28. The first oil passage 130 is connected to an oil cooler 142 through the cooler oil passage 140 and the third oil passage 134 is shut off (blocked). At the release of the lockup clutch 28, the operating oil in the torque converter 32 is agitated by the relative rotation of the turbine impeller 32$t$ and the pump impeller 32$p$ and the AT oil temperature $T_{OIL}$ is increased. However, the operating oil is returned through the oil cooler 142 to the oil pan 112 and the temperate increase in the operating oil is constrained. The lockup relay valve 102 is switched to the ON-side communication state and the OFF-side communication state by the spool being alternatively moved to two positions depending on whether a predetermined signal oil pressure is supplied from the solenoid valve SL.

Figure 11:
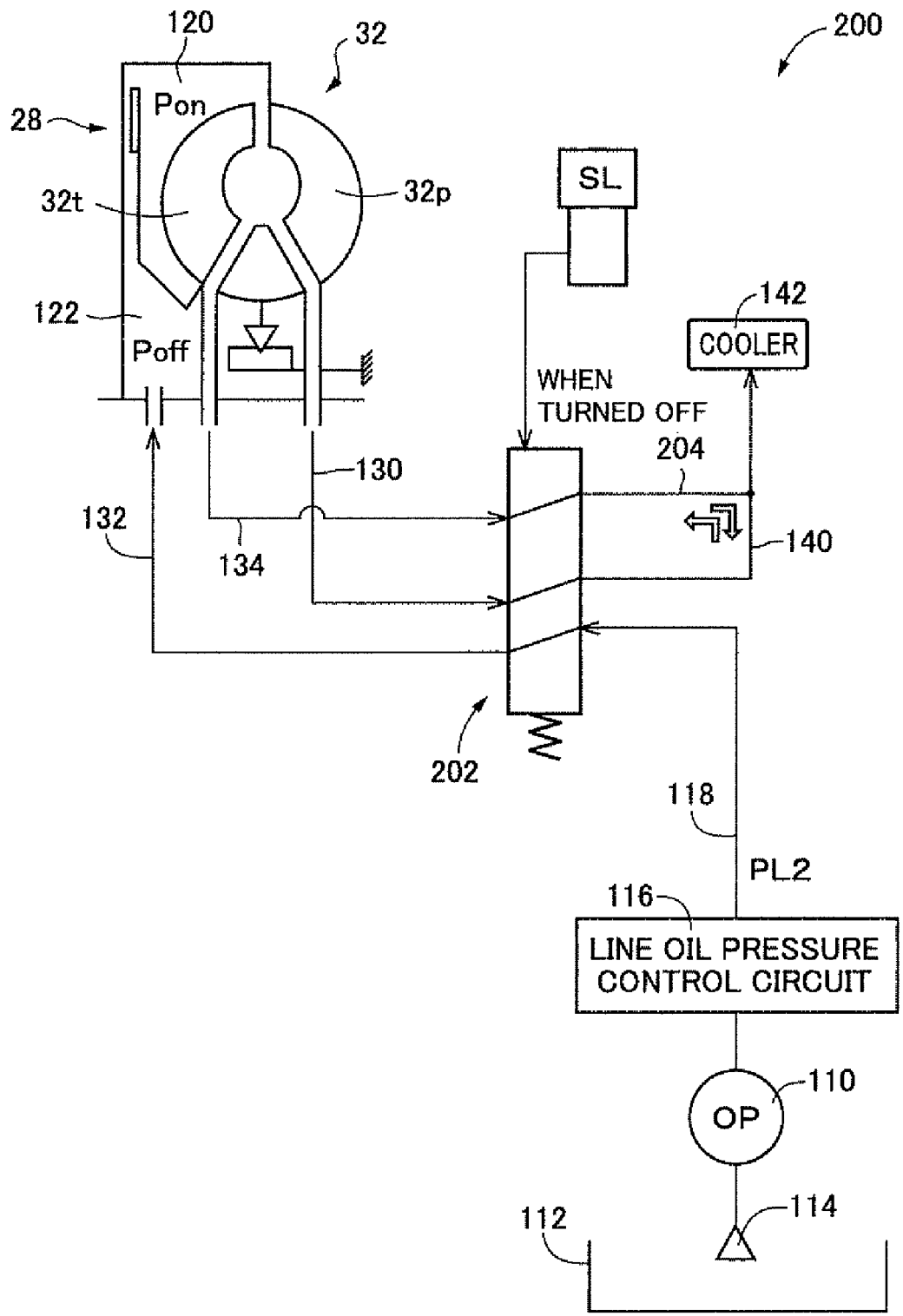
FIG. 11 is a diagram of a circuit configuration when the lockup relay valve is turned to the OFF-side communication state in the hydraulic control device of FIG. 10.

In the hydraulic control device 100 of the lockup clutch 28 configured as above, the second line oil pressure PL2 is supplied from the second oil passage 132 to the lockup clutch 28 at the release of the lockup clutch. At the release of the lockup clutch, as apparent from FIG. 8, the third oil passage 134 is shut off (blocked) to inhibit the discharge of the operating oil. Therefore, when a vehicle stops in a driving range such as a D-range at low oil temperature such as the initial stage of starting the engine 30, if air-mixed operating oil is supplied from the second oil passage 132 into the torque converter 32, the operating oil is prevented from circulating through the first oil passage 130, the third oil passage 134, and the cooler oil passages 140, 204 unlike FIG. 11. Therefore, regardless of larger pipe passage resistance due to higher viscosity, the operating oil in the torque converter 32 is certainly discharged from the first oil passage 130 through the cooler oil passage 140 to the oil cooler 142 and bubbles in the torque converter 32 is reduced in association of the discharge of the operating oil. This constrains the deterioration of transmission torque at the start due to the bubbles in the torque converter 32 and the drive performance is improved at the start of the vehicle at low oil temperature.

This embodiment utilizes the lockup relay valve 102 that switches the engagement and release of the lockup clutch 28 as a means that shuts off the third oil passage 134 at the release of the lockup clutch. The lockup relay valve 102 is switched to the OFF-side communication state to connect the line oil passage 118 to the second oil passage 132 and to connect the first oil passage 130 to the cooler oil passage 140 and shut off (block) the third oil passage 134. As a result, the configuration may easily and inexpensively be achieved by only slightly changing the oil passage in the existing lockup relay valve 202 depicted in FIG. 10 or slightly changing the surrounding oil passages without changing the lockup relay valve 202.

Figure 10:
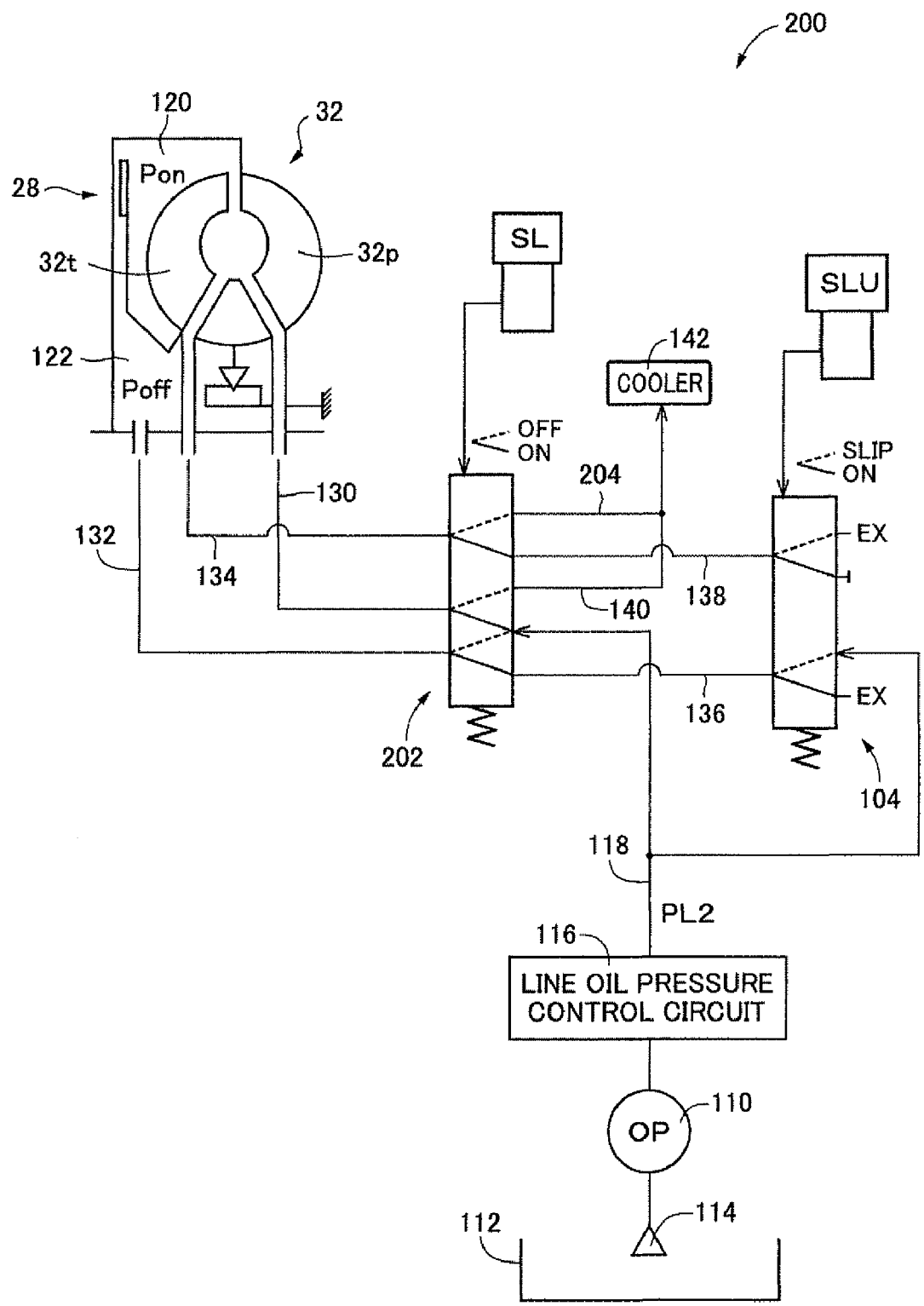
FIG. 10 is a diagram for explaining the hydraulic control device that is the premise of the present invention, corresponding to FIG. 6.

As compared to the hydraulic control device 100 of FIG. 6, FIG. 10 depicting the hydraulic control device 200 of the premise of the present invention is different in the operation when the lockup relay valve 202 is turned to the OFF-side communication state indicated by solid lines. The third oil passage 134 is linked through the cooler oil passage 204 to the cooler oil passage 140 and connected to the oil cooler 142. In this case, if a vehicle stops for a long time in a driving range such as a D-range at low oil temperature such as the initial stage of starting the engine 30, the oil surface (oil level) of the oil pan 112 lowers at low oil temperature. Therefore, bubble-mixed operating oil due to suction of air is supplied from the second oil passage 132 to the torque converter 32 and discharged from the first oil passage 130 and the third oil passage 134 through the cooler oil passages 140 and 204 to the oil cooler 142. However, since the rotation of the turbine impeller 32t stops when a vehicle stops, bubbles easily stay and accumulate in the torque converter 32.

The viscosity of the operating oil becomes high at low oil temperature and the pipe passage resistance of the oil cooler 142 becomes large. Therefore, as indicated by white arrows of FIG. 11, the operating oil circulates from one of the first oil passage 130/the cooler oil passage 140 and the third oil passage 134/the cooler oil passage 204 to the other instead of going to the oil cooler 142 and the bubble-mixed operating oil easily keeps staying in the torque converter 32. If a large amount of such bubbles stays in the torque converter 32 due to a long stop, the starting drive performance is impaired since sufficient transmission torque of the torque converter 32 is unable to be acquired because of the presence of bubbles at the start of the vehicle.

Figure 9:
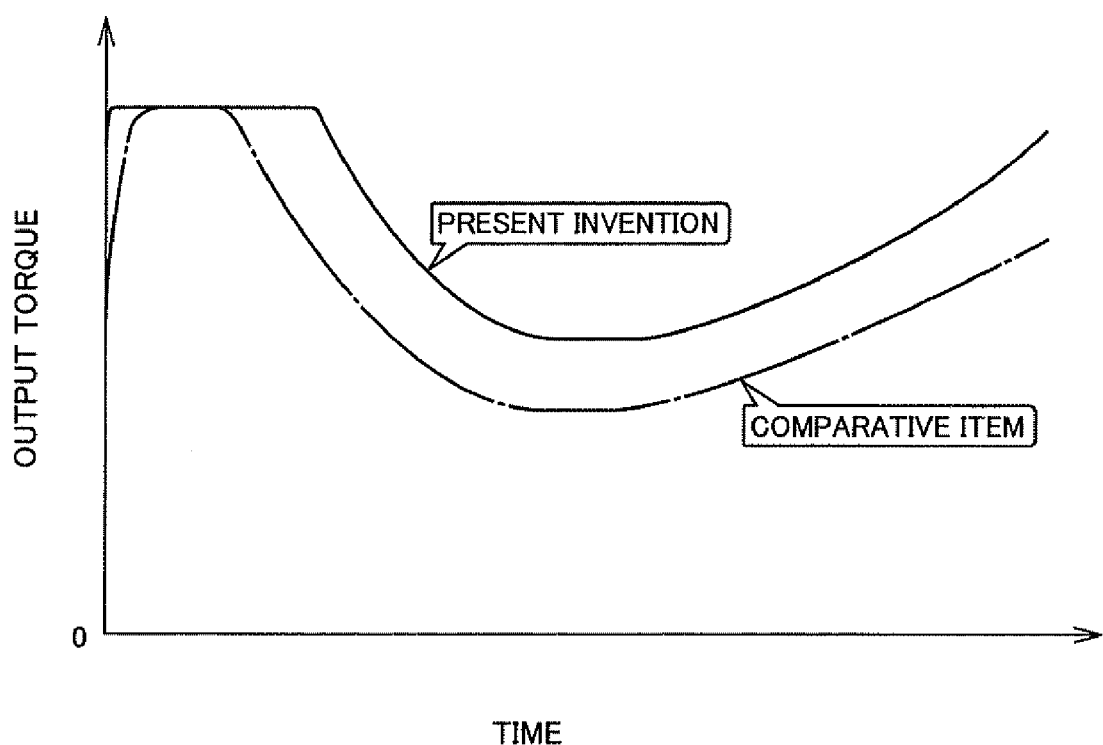
FIG. 9 is a diagram of comparison between results of output torque measured when the hydraulic control device of the present invention and a hydraulic control device depicted in FIG. 10 are used for the rotating drive at a predetermined rotating speed in D-range at the release of the lockup clutch.

FIG. 9 is a graph of results of output torque measured under the following test conditions using vehicle power transmitting devices including the hydraulic control device 100 of this embodiment and the hydraulic control device 200 depicted in FIG. 10. In this test, the pump impeller 32p of the torque converter 32 is driven to be rotated with the both axles 38 fixed in D-range at the release of the lockup clutch. In this embodiment of the present invention, drop-off of the output torque is made smaller as compared to the comparative item (hydraulic control device 200) and goes back more quickly. A sub-zero temperature of the following test condition is used to assume a situation of low temperature in cold climates and an idle rotating velocity is used to assume an engine rotating velocity during idling up in cold climates.

<<Test Conditions>>
   oil amount: an oil amount reduced by a predetermined amount from a standard oil amount
   oil temperature: sub-zero
   input rotating velocity: idle rotating velocity Although the embodiment of the present invention has been described in detail with reference to the drawings, this is only an embodiment and the present invention may be implemented in an aspect having various modifications and improvements made based on the knowledge of those skilled in the art.

The invention claimed is:

1. A hydraulic control device controlling a lockup clutch included in a fluid-type power transmitting device, comprising:
   a first oil passage communicated with an engagement-side oil chamber for engaging the lockup clutch to be engaged/released based on an oil pressure to supply an engagement oil pressure to the engagement-side oil chamber at engagement including slip state of the lockup clutch;
   a second oil passage communicated with an release side oil chamber for releasing the lockup clutch to supply a release oil pressure to the release-side oil chamber at release of the lockup clutch;
   a third oil passage communicated with the engagement-side oil chamber of the lockup clutch to discharge operating oil in the engagement-side oil chamber at the slip state of the lockup clutch; and
   a discharge inhibiting means that inhibits discharge of the operating oil from the third oil passage at the release of the lockup clutch with the release oil pressure supplied from the second oil passage to the lockup clutch.

2. The hydraulic control device of the lockup clutch of claim 1, wherein the discharge inhibiting means includes an oil passage switching valve to shut off the third oil passage at the release of the lockup clutch.

3. The hydraulic control device of the lockup clutch of claim 2, wherein the oil passage switching valve is a lockup relay valve that controls supply/discharge of oil pressure to/from the lockup clutch to switch the engagement/release of the lockup clutch.

4. The hydraulic control device of the lockup clutch of claim 2, wherein at the release of the lockup clutch, the oil passage switching valve forms a release state for connecting the second oil passage to a line oil passage, connecting the first oil passage to an oil cooler, and disconnecting the third oil passage from a discharging oil passage.

5. The hydraulic control device of the lockup clutch of claim 4, wherein the oil passage switching valve forms the release state at least when temperature of the operating oil is lower than a predetermined value.

6. The hydraulic control device of the lockup clutch of claim 4, wherein the hydraulic control device further includes a lockup control valve connected to the discharging oil passage.

7. The hydraulic control device of the lockup clutch of claim 2, wherein at the engagement of the lockup clutch, the oil passage switching valve forms an engagement state for connecting the first oil passage to a line oil passage and connecting the second oil passage and the third oil passage to a discharging oil passage.

8. The hydraulic control device of the lockup clutch of claim 2, wherein the fluid-type power transmitting device is a torque converter and is disposed between a power source and a transmission.

* * * * *